US006837316B2

(12) United States Patent
Reddy et al.

(10) Patent No.: US 6,837,316 B2
(45) Date of Patent: Jan. 4, 2005

(54) METHODS OF CONSOLIDATING FORMATIONS

(75) Inventors: B. Raghava Reddy, Duncan, OK (US); Larry S. Eoff, Duncan, OK (US); Donald L. Whitfill, Kingwood, TX (US); J. Michael Wilson, Duncan, OK (US); Denise Berryhill, Duncan, OK (US); Russel M. Fitzgerald, Waurika, OK (US); Thomas E. Becker, Duncan, OK (US); Jimmie D. Weaver, Duncan, OK (US)

(73) Assignee: Halliburtn Energy Services, Inc., Duncan, OK (US)

( * ) Notice: Subject to any disclaimer, the term of this patent is extended or adjusted under 35 U.S.C. 154(b) by 0 days.

(21) Appl. No.: 10/716,730

(22) Filed: Nov. 19, 2003

(65) Prior Publication Data

US 2004/0069538 A1 Apr. 15, 2004

Related U.S. Application Data

(62) Division of application No. 10/170,400, filed on Jun. 13, 2002, now Pat. No. 6,702,044.

(51) Int. Cl.$^7$ .................. E21B 21/00; E21B 33/138; C09K 7/02

(52) U.S. Cl. .................. 175/64; 166/295; 166/300; 175/65; 175/72; 507/118; 507/211; 507/224; 507/225; 507/230; 507/903

(58) Field of Search .................. 166/287, 294, 166/295, 300; 175/64, 65, 72; 507/110, 118, 119, 120, 140, 211, 220, 224, 225, 230, 903; 523/130, 131

(56) References Cited

U.S. PATENT DOCUMENTS

| | | |
|---|---|---|
| 2,356,302 A | 8/1944 | Chapman |
| 2,562,866 A | 7/1951 | Kurtz, Jr. et al. ......... 260/29.4 |
| 2,649,159 A | 8/1953 | Boyer ................... 166/22 |
| 2,730,497 A | 1/1956 | Suen et al. |
| 3,042,608 A * | 7/1962 | Morris ................... 507/112 |
| 3,087,544 A | 4/1963 | Forsman ................ 166/295 |
| 3,126,959 A | 3/1964 | Ortloff .................. 166/287 |
| 3,935,910 A | 2/1976 | Gaudy et al. ............. 175/17 |
| 3,956,140 A * | 5/1976 | Nahm et al. ............. 507/117 |
| 3,976,135 A | 8/1976 | Anderson ............... 166/276 |
| 4,042,032 A | 8/1977 | Anderson et al. ......... 166/276 |
| 4,105,618 A | 8/1978 | Sifferman et al. ........ 260/33.6 |
| 4,199,484 A | 4/1980 | Murphey ................ 260/13 |
| 4,216,829 A * | 8/1980 | Murphey ................ 166/276 |
| 4,301,016 A | 11/1981 | Carriere et al. |
| 4,579,668 A | 4/1986 | Messenger |
| 4,649,998 A | 3/1987 | Friedman ............... 166/294 |
| 4,671,883 A | 6/1987 | Connell et al. |
| 4,706,755 A * | 11/1987 | Roark et al. ............. 166/295 |
| 4,722,397 A | 2/1988 | Sydansk et al. .......... 166/295 |
| 4,760,882 A | 8/1988 | Novak .................. 166/295 |
| 4,784,223 A | 11/1988 | Worrall et al. .......... 166/287 |
| 4,811,789 A | 3/1989 | Jennings, Jr. et al. ..... 166/276 |
| 4,821,802 A | 4/1989 | Meltz et al. ............ 166/270 |
| 4,964,465 A | 10/1990 | Surles ................. 166/295 |
| 5,094,762 A | 3/1992 | Lahalih ................ 507/117 |
| 5,295,541 A | 3/1994 | Ng .................... 166/277 |
| 5,458,195 A | 10/1995 | Totten et al. ........... 166/293 |
| 5,558,171 A | 9/1996 | McGlothlin et al. ....... 175/64 |
| 5,569,324 A | 10/1996 | Totten et al. ........... 166/696 |
| 5,578,672 A | 11/1996 | Beall et al. ............ 524/446 |
| 5,711,383 A | 1/1998 | Terry et al. ............. 175/72 |
| 5,783,527 A | 7/1998 | Dobson, Jr. et al. ...... 507/269 |
| 5,866,516 A | 2/1999 | Costin ................. 507/103 |
| 5,911,282 A | 6/1999 | Onan et al. ............. 175/72 |
| 5,913,364 A | 6/1999 | Sweatman .............. 166/281 |
| 5,945,387 A | 8/1999 | Chatterji et al. ......... 507/224 |
| 5,968,879 A | 10/1999 | Onan et al. ............. 507/202 |
| 6,012,524 A | 1/2000 | Chatterji et al. ......... 166/295 |
| 6,059,035 A | 5/2000 | Chatterji et al. ......... 166/293 |
| 6,107,256 A | 8/2000 | Udarbe et al. ........... 507/120 |
| 6,124,246 A | 9/2000 | Heathman et al. ........ 507/219 |
| 6,152,227 A | 11/2000 | Lawson et al. .......... 166/293 |
| 6,167,967 B1 | 1/2001 | Sweatman .............. 166/281 |
| 6,176,315 B1 | 1/2001 | Reddy et al. ........... 166/295 |
| 6,209,646 B1 | 4/2001 | Reddy et al. ........... 166/300 |
| 6,258,757 B1 | 7/2001 | Sweatman et al. ....... 507/219 |
| 6,271,181 B1 | 8/2001 | Chatterji et al. ........ 507/219 |
| 6,328,106 B1 | 12/2001 | Griffith et al. ......... 166/295 |
| 6,401,817 B1 | 6/2002 | Griffith et al. ......... 166/295 |
| 6,482,776 B1 | 11/2002 | Matz et al. ............ 507/120 |
| 6,508,306 B1 | 1/2003 | Reddy et al. ........... 166/295 |

FOREIGN PATENT DOCUMENTS

| | | |
|---|---|---|
| EP | 0 997 515 A1 | 5/2000 |
| WO | WO 01/98626 A1 | 12/2001 |
| WO | WO 01/98627 A1 | 12/2001 |
| WO | WO 02/04784 A2 | 1/2002 |

OTHER PUBLICATIONS

Abstract No. XP–002255423 entitled "Stabilizing reagents for drilling solution comprise derivative of polyethyleneimine which provide stability in presence of minerals and raise temperatures," by Gembitskii, P.A. et al.

Abstract No. XP–002255422 entitled "Lost circulation zone polymer plugging—uses hardener with adduct of polyethyleneimine and copper sulphate taken in specified proportion," by Abdurakhim, N. et al.

* cited by examiner

Primary Examiner—George Suchfield
(74) Attorney, Agent, or Firm—Craig W. Roddy; McAfee & Taft

(57) ABSTRACT

Methods of consolidating formations include drilling a well bore with a drilling fluid that comprises water, a polymeric cationic catalyst which is adsorbed on minerals and rocks in weak unconsolidated zones or formations and then further contacting the unconsolidated formation with a treating fluid comprising a water soluble or dispersible polymer which is cross-linked by a thermoset resin and causes the resin to be hard and tough when cured, and a water soluble or dispersible thermoset resin which cross-links the polymer, is catalyzed and cured by the catalyst and consolidates the weak zone or formation so that sloughing is prevented.

37 Claims, No Drawings

METHODS OF CONSOLIDATING FORMATIONS

CROSS-REFERENCE TO RELATED APPLICATION

This is a Divisional of application Ser. No. 10/170,400 filed on Jun. 13, 2002, now U.S. Pat. No. 6,702,044.

BACKGROUND OF THE INVENTION

1. Field of the Invention

The present invention relates to methods of consolidating unconsolidated weak zones or formations formed of clays, shales, sand stone and the like.

2. Description of the Prior Art

Rotary drilling methods are commonly utilized in the drilling of oil and gas wells. That is, the well bore which extends from the surface into one or more subterranean oil and/or gas producing formations is drilled by a rotary drilling rig on the surface which rotates a drill bit attached to a string of drill pipe. The drill bit includes rotatable cutting surfaces so that when the drill bit is rotated by the drill string against subterranean strata under pressure a bore hole is produced.

A drilling fluid is circulated downwardly through the drill string, through the drill bit and upwardly in the annulus between the walls of the well bore and the drill string. The drilling fluid functions to maintain hydrostatic pressure on formations penetrated by the well bore and to remove cuttings from the well bore. As the drilling fluid is circulated, a filter cake of solids from the drilling fluid forms on the walls of the well bore. The filter cake build-up is a result of initial fluid loss into permeable formations and zones penetrated by the well bore. The presence of the filter cake reduces additional fluid loss as the well is drilled.

In addition to removing cuttings from the well bore and forming filter cake on the well bore, the drilling fluid cools and lubricates the drill bit and exerts a hydrostatic pressure against the well bore walls to prevent blow-outs, i.e., to prevent pressurized formation fluids from flowing into the well bore when formations containing the pressurized fluids are penetrated. The hydrostatic pressure created by the drilling fluid in the well bore may fracture low mechanical strength formations penetrated by the well bore which allows drilling fluid to be lost into the formations. When this occurs, the drilling of the well bore must be stopped and remedial steps taken to seal the fractures which are time consuming and expensive.

In order to insure that fracturing of low mechanical strength formations penetrated by the well bore and other similar problems do not occur, it has heretofore been the practice to intermittently seal the well bore by cementing pipe referred to in the art as casing or liners in the well bore. The points in the well bore during its drilling at which the drilling is stopped and casing or liners are installed in the well bore are commonly referred to as "casing points". Casing or a liner is placed in the well bore above each casing point and a sealing composition such as a hydraulic cement composition is pumped into the annular space between the walls of the well bore and the exterior surface of the casing or liner disposed therein. The hydraulic cement composition is permitted to set in the annulus thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented. This technique of cementing pipe in the well bore as the drilling progresses has a number of disadvantages including the time and expense incurred in placing and sealing the pipe as well as the reduction in the well diameter after each casing point. That is, the well diameter must be reduced below each casing point so that a smaller casing can be lowered through the previously placed casing and sealed in the well bore.

Another problem that occurs in the drilling and completion of well bores is that when the well bore is drilled into and through unconsolidated weak zones or formations formed of clays, shales, sand stone and the like, unconsolidated clay, shale and sand slough off the sides of the well bore which enlarges the well bore and often causes the drill bit and drill pipe to become stuck whereby drilling must be stopped and remedial steps taken.

Thus, there are needs for improved methods of drilling well bores whereby unconsolidated weak zones or formations are consolidated and the mechanical strength of the well bore is increased during drilling without the need to stop drilling for prolonged periods of time.

SUMMARY OF THE INVENTION

By the present invention, methods of consolidating unconsolidated weak zones or formations during drilling are provided. Also, methods of forming a hard and tough chemical casing in a well bore during drilling to increase the mechanical strength of the well bore are provided. The chemical casing formed while drilling also prevents undesirable migration of fluid between zones or formations penetrated by the well bore, generally referred to as "zonal isolation." The methods of consolidating unconsolidated weak zones or formations during drilling or forming a hard and tough chemical casing during drilling can be carried out separately or simultaneously.

A method of this invention for consolidating unconsolidated weak zones or formations formed of clays, shales, sand stone and the like while drilling a well bore penetrating the zones or formations to prevent sloughing is as follows. A well bore is drilled with a drilling fluid having a pH in the range of from about 6 to about 10 and comprised of water, a polymeric cationic catalyst capable of accepting and donating protons which is adsorbed on the unconsolidated clays, shales, sand stone and the like, a water soluble or dispersible polymer which is cross-linkable by a thermoset resin and causes the resin to be hard and tough when cured and a water soluble or dispersible thermoset resin which cross-links the polymer, is catalyzed and cured by the catalyst and consolidates the weak zones or formations so that sloughing is prevented.

Another method of this invention for consolidating unconsolidated weak zones or formations formed of clays, shales, sand stone and the like while drilling a well bore penetrating the zones or formations to prevent sloughing is comprised of the following steps. A well bore is drilled with a drilling fluid having a pH in the range of from about 6 to about 10 and comprised of water and a polymeric cationic catalyst capable of accepting and donating protons which is adsorbed on the unconsolidated clays, shales, sand stone and the like. Thereafter, the well bore is contacted with a treating fluid having a pH in the range of from about 6 to about 10 and comprised of water, a water soluble or dispersible polymer which is cross-linkable by a thermoset resin and causes the resin to be hard and tough when cured and a water soluble or dispersible thermoset resin which cross-links the polymer, is catalyzed and cured by the catalyst and consolidates the weak zones or formations so that sloughing is prevented.

A method of this invention for forming a chemical casing in a well bore to improve the mechanical strength thereof and/or prevent undesirable migration of fluids between zones or formations while drilling the well bore is as follows. A well bore is drilled with a drilling fluid having a pH in the range of from about 6 to about 10 and comprised of water, a water soluble or water dispersible polymer which is cross-linkable by thermoset resins and causes the resins to be hard and tough when cured, a particulate curable solid thermoset resin, a water soluble thermoset resin, and a delayed dispersible acid catalyst for curing the solid thermoset resin and the water soluble thermoset resin, the drilling fluid forming a filter cake on the walls of the well bore that cures into a hard and tough cross-linked chemical casing thereon.

A method of this invention for consolidating unconsolidated weak zones or formations formed of clays, shales, sand stone and the like to prevent sloughing and forming a chemical casing in a well bore penetrating the weak zones or formations to improve the mechanical strength of the well bore and/or prevent undesirable migration of fluids between zones or formations while drilling the well bore is as follows. A well bore is drilled with a drilling fluid having a pH in the range of from about 6 to about 10 and comprised of water, a polymeric cationic catalyst capable of accepting and donating protons which is adsorbed on the unconsolidated clays, shales, sand stone and the like, a water soluble or dispersible polymer which is cross-linkable by a thermoset resin and causes the resin to be hard and tough when cured, a particulate curable solid thermoset resin, a water soluble thermoset resin and a delayed dispersible acid catalyst for curing the thermoset resins, the drilling fluid forming a filter cake on the walls of the well bore that cures and consolidates the unconsolidated weak zones and formations penetrated by the well bore so that sloughing is prevented and forms a hard and tough cross-linked chemical casing on the walls of the well bore which prevents the undesirable migration of fluids between zones or formations.

Another method of this invention for consolidating unconsolidated weak zones or formations formed of clays, shales, sand stone and the like to prevent sloughing and forming a chemical casing in a well bore penetrating the weak zones or formations to improve the mechanical strength of the well bore while drilling the well bore is comprised of the following steps. A well bore is drilled with a drilling fluid having a pH in the range of from about 6 to about 10 and comprised of water, a polymeric cationic catalyst capable of accepting and donating protons which is adsorbed on the unconsolidated clays, shales, sand stone and the like, a particulate curable solid thermoset resin and a delayed acid catalyst for curing the solid thermoset resin, the drilling fluid forming a filter cake on the walls of the well bore that cures and consolidates the unconsolidated weak zones and formations penetrated by the well bore so that sloughing is prevented. Thereafter, the well bore is contacted with a treating fluid comprised of water, a water soluble or dispersible polymer which is cross-linkable by a thermoset resin and causes the resin to be hard and tough when cured and a water soluble or dispersible thermoset resin, the treating fluid components depositing on the filter cake formed by the drilling fluid and the thermoset resin curing into a hard and tough cross-linked chemical casing on the walls of the well bore.

The objects, features and advantages of the invention will be readily apparent to those skilled in the art upon a reading of the description of preferred embodiments which follows.

DESCRIPTION OF PREFERRED EMBODIMENTS

The present invention provides methods of consolidating unconsolidated weak zones or formations formed of clays, shales, sand stone and the like while drilling a well bore penetrating the zones or formations to prevent sloughing, methods of forming a hard and tough cross-linked chemical casing in a well bore while drilling the well bore which increases the mechanical strength of the well bore and provides zonal isolation and methods of both consolidating unconsolidated weak zones or formations penetrated by a well bore and forming a hard and tough cross-linked chemical casing in the well bore while drilling the well bore.

Unstable materials such as clays, shales, sand stone and the like make up a high percentage of the formations in which wells are drilled, and a majority of well bore problems are a result of the instability of such materials, particularly shale instability. Shales are sedimentary rocks that contain a variety of clays. Shales containing montmorillonite, often referred to as smectite clays, swell and disperse when contacted by water. Shales which swell upon contacting water are often referred to as heaving or sloughing shales. Such shales upon contact with aqueous drilling fluids swell and fracture rendering the well bore wall unstable. In such cases, the well bore wall sloughs into the well bore. Sloughing of shale and other similar unstable materials into the well bore can cause the drill string to become stuck and can enlarge the well bore resulting in large subterranean cavities. Additionally, when sloughing occurs while the drill bit is being changed at the surface, the well bore fills up and must be cleared before drilling can proceed. Furthermore, the heaving unstable material suspended in the drilling fluid increases its solid content, and as a result, the viscosity of the drilling fluid increases to the point where the drilling fluid must be chemically treated to reduce its viscosity or it must be diluted followed by the addition of weighting material to maintain its mud weight. The instability of clays, shales, sand stone and the like is also caused by hydraulic pressure differential leading to fluid transport and by pressure changes near the well bore as the drilling fluid compresses pore fluid and diffuses a pressure front into the formation. The chemicals and other materials used in accordance with the present invention prevent swelling and dispersion of unstable materials, reduce pressure transmission from the well bore fluids and prevent drilling fluid penetration into the unstable materials by building an impenetrable lining at the unstable material/well bore interface.

Consolidating unconsolidated weak zones or formations formed of clays, shales, sand stone and the like while drilling a well bore prevents sloughing of the clays, shales, sand stone and the like into the well bore and prevents the need for implementing time consuming and costly remedial steps. The formation of a hard and tough chemical casing in a well bore while the well bore is being drilled increases the mechanical strength of the well bore whereby hydrostatic pressure exerted on the well bore by the drilling fluid does not cause fractures or the like to occur in the well bore. Such fractures cause drilling fluid to be lost and also require stoppage of the drilling operation and costly remedial steps to be taken. Another significant advantage of increasing the mechanical strength of the well bore by forming a hard and tough chemical casing thereon is the reduction or elimination of casing points at which casing or liners are cemented in the well bore which reduces or eliminates the overall time and cost of cementing the well. An additional advantage is that the well bore has a larger diameter in the production zone due to fewer casing points which increases productivity.

A method of the present invention for consolidating unconsolidated weak zones or formations formed of clays, shales, sand stone and the like while drilling a well bore penetrating the zones or formations to prevent sloughing comprises drilling the well bore with a drilling fluid having a pH in the range of from about 6 to about 10, preferably about 8. The drilling fluid is comprised of water, a polymeric cationic catalyst capable of accepting and donating protons which is adsorbed on the unconsolidated clays, shales, sand stone and the like, a water soluble or dispersible polymer which is cross-linkable by a thermoset resin and causes the resin to be hard and tough when cured and a water soluble or dispersible thermoset resin which cross-links the polymer, is catalyzed and cured by the catalyst and consolidates the weak zones or formations so that sloughing is prevented.

The water utilized to form the drilling fluid can be fresh water, unsaturated salt solutions or saturated salt solutions, including brine and seawater. Generally, water from any source can be utilized so long as it doesn't adversely react with components of the drilling fluid.

Examples of polymeric cationic catalysts capable of accepting and donating protons which are adsorbed on clays, shales, sand stone and the like include, but are not limited to, polyethyleneimine, poly(dimethylaminoethylmethacrylate) and poly(dimethylaminopropylmethacrylate). Of these, polyethyleneimine is preferred. The polymeric cationic catalyst is generally included in the drilling fluid in an amount in the range of from about 1% to about 15% by weight of water in the drilling fluid, more preferably in an amount in the range of from about 2% to about 10% by weight of the water and most preferably in an amount of about 6%.

The water soluble or dispersible polymers which are cross-linked by the thermoset resins utilized in accordance with this invention are polymers containing one or more of hydroxyl, amide, carboxyl and epoxy functional groups. Examples of such polymers include, but are not limited to, acrylic latexes, polyvinylalcohol, polyvinylbutyral, polyesters, polyalkylacrylic acids, polyurethanes, acrylamide polymers, proteins, polyols and polysaccharides such as chitosan, hydroxyethylcellulose, carboxymethylhydroxyethylcellulose, water soluble starches, guar gum, xanthan gum, welan gum, carragenan gum and arabic gum. Of these, polysaccharides are preferred. The water soluble or dispersible polymer which is cross-linked by thermoset resins is generally included in the drilling fluid in an amount in the range of from about 0.5% to about 20% by weight of water in the drilling fluid, more preferably in an amount in the range of from about 1% to about 10% by weight of the water and most preferably in an amount of about 3%.

The water soluble or dispersible thermoset resins (including particulate solid thermoset resins having a particle size in the range of from about 50 to about 1000) utilized in accordance with this invention are selected from melamine-formaldehyde type resins, i.e., amino resins made from melamine and formaldehyde, urea-formaldehyde type resins, i.e., amino resins made from urea and formaldehyde and phenol-formaldehyde type resins, i.e., synthetic thermoset resins made from phenol and formaldehyde. More preferably, the thermoset resins utilized are selected from alkyl ethers of melamine-formaldehyde resins and alkyl ethers of urea-formaldehyde resins. Of these, alkyl ethers of melamine-formaldehyde resins are preferred. An alkyl ether of melamine-formaldehyde resin which is particularly suitable is commercially available under the tradename "ASTRO CR1™" from Borden Chemical of Springfield, Oreg., USA. The water soluble or dispersible thermoset resin utilized in the above described method is generally present in the drilling fluid in an amount in the range of from about 5% to about 80% by weight of water in the drilling fluid, more preferably in an amount in the range of from about 20% to about 70% by weight of water and most preferably in an amount of about 50%.

The thermoset resins described above, when catalyzed by heat, catalysts or other means, form substantially infusible or insoluble materials which do not soften on reheating. When cross-linked and cured, the thermoset polymers are strong, hard and tough.

As will be understood by those skilled in the art, the drilling fluids of this invention can include other conventional components such as weighting materials, viscosifiers, dispersants and fluid loss control agents.

Another method of this invention for consolidating unconsolidated weak zones or formations formed of clays, shales, sand stone and the like while drilling a well bore penetrating the zones or formations to prevent sloughing is comprised of the following steps. The well bore is drilled with a drilling fluid having a pH in the range of from about 6 to about 10, preferably 8, and is comprised of water and a polymeric cationic catalyst capable of accepting and donating protons which is adsorbed on the unconsolidated clays, shales, sand stone and the like. Thereafter, the well bore is contacted with a treating fluid having a pH in the range of from about 6 to about 10, preferably 8, and comprised of water, a water soluble or dispersible polymer which is cross-linkable by a thermoset resin and causes the resin to be hard and tough when cured and a water soluble or dispersible thermoset resin which cross-links the polymer, is catalyzed and cured by the catalyst and consolidates the weak zones or formations so that sloughing is prevented.

The components of the drilling fluid and treating fluid of the above described method, i.e., the water, the polymeric cationic catalyst, the water soluble or dispersible polymer which is cross-linkable by a thermoset resin and the water soluble or dispersible thermoset resin are the same as those previously described.

The polymeric cationic catalyst is present in the drilling fluid in a general amount in the range of from about 1% to about 15% by weight of water in the drilling fluid, more preferably in an amount in the range of from about 2% to about 10% by weight of the water and most preferably in an amount of about 6%.

The water soluble or dispersible polymer which is cross-linked by a thermoset resin is present in the treating fluid in a general amount in the range of from about 0.5% to about 20% by weight of water in the treating fluid, more preferably in an amount in the range of from about 1% to about 10% of the water and most preferably in an amount of about 3%. The water soluble or dispersible thermoset resin is present in the treating fluid in a general amount in the range of from about 5% to about 80% by weight of the water and most preferably in an amount of about 50%.

The drilling fluid as well as the treating fluid can also include other additives which are well known to those skilled in the art such as weighting materials, viscosifiers, dispersants and fluid loss control agents.

The first method described above which utilizes a single fluid for drilling the well bore and simultaneously consolidating weak zones or formations is utilized at locations where it is known that unconsolidated weak zones and formations will be encountered. The second method described above which utilizes both a drilling fluid and a treating fluid is used in drilling applications where it is unknown if unconsolidated weak zones or formations will be encountered. In the second method, if unconsolidated weak zones or formations are not encountered, the treating fluid step is not required and the time and expense required for performing the treating fluid step will be saved.

A method of this invention for forming a chemical casing in a well bore for improving the mechanical strength thereof and provide zonal isolation to prevent fluid flow between zones or formations while drilling the well bore is as follows. The well bore is drilled with a drilling fluid having a pH in the range of from about 6 to about 10, preferably 8. The drilling fluid is comprised of water, a water soluble or water dispersible polymer which is cross-linkable by a thermoset resin and causes the resin to be hard and tough when cured, a particulate curable solid thermoset resin, a water soluble thermoset resin, and a delayed dispersible acid catalyst for curing the solid thermoset resin and the water soluble thermoset resin. The drilling fluid components form a filter cake on the walls of the well bore that cures into a hard and tough cross-linked chemical casing thereon.

The water soluble or dispersible polymer which is cross-linked by a thermoset resin is selected from the group consisting of polymers containing one or more of hydroxyl, amide, carboxyl and epoxy functional groups. Examples of such polymers include, but are not limited to, acrylic latexes, polyvinylalcohol, polyvinylbutyral, polyesters, polyalkylacrylic acids, polyurethanes, acrylamide polymers, proteins, polyols and polysaccharides such as chitosan, hydroxyethylcellulose, carboxymethylhydroxyethylcellulose, water soluble starches, guar gum, xanthan gum, welan gum, carragenan gum and arabic gum. The polymer is included in the drilling fluid in an amount in the range of from about 0.5% to about 20% by weight of water in the drilling fluid, more preferably in an amount in the range of from about 1% to about 10% by weight of water and most preferably in an amount of about 3%.

As mentioned above, the particulate curable solid thermoset resin has a particle size in the range of from about 50 to about 1000 microns and is selected from particulate solid melamine-formaldehyde type resins, urea-formaldehyde type resins or phenol-formaldehyde type resins, and more preferably from particulate solid alkyl esters of melamine-formaldehyde resins and particulate solid alkyl esters of urea-formaldehyde resins. Of these, the particulate solid alkyl esters of melamine-formaldehyde resins are preferred. The particulate curable solid thermoset resin used is included in the drilling fluid in the general amount in the range of from about 5% to about 50% by weight of water in the drilling fluid, more preferably in an amount in the range of from about 10% to about 30% by weight of water and most preferably in an amount of about 15%.

The water soluble thermoset resin is selected from water soluble melamine-formaldehyde type resins, urea-formaldehyde type resins or phenol-formaldehyde type resins, and more preferably from water soluble alkyl ethers of melamine-formaldehyde resins and water soluble alkyl ethers of urea-formaldehyde resins. Of these, water soluble alkyl ethers of melamine-formaldehyde resins are preferred. The water soluble thermoset resin used is included in the drilling fluid in an amount in the range of from about 5% to about 80% by weight of water in the drilling fluid, more preferably in an amount in the range of from about 20% to about 70% by weight of water and most preferably in an amount of about 50%.

The acid in the delayed dispersible acid catalyst is an organic or inorganic acid selected from the group consisting of p-toluene sulfonic acid, dinonylnaphthalene sulfonic acid, dodecyl benzene sulfonic acid, oxalic acid, maleic acid, hexamic acid, a copolymer of phthalic and acrylic acid, trifluoromethane sulfonic acid, phosphoric acid, sulfuric acid, hydrochloric acid, sulfamic acid and ammonium salts that produce acids when dissolved in water. Of these, ammonium chloride is preferred. The acid in the delayed acid utilized is included in the drilling fluid in a general amount in the range of from about 0.5% to about 8% by weight of thermoset resin in the drilling fluid, more preferably in an amount in the range of from about 1% to about 6% by weight of resin and most preferably in an amount of about 4%.

The acid utilized can be delayed using various techniques known to those skilled in the art. A preferred technique for controlling the release of the acid catalyst utilized in the present invention is to cause the acid to be absorbed into a particulate porous solid material whereby the acid is encapsulated. When the encapsulated acid is combined with the drilling fluid, it is slowly released into the drilling fluid. While a variety of porous solid materials can be utilized, particularly suitable such materials are inorganic porous solid materials which remain dry and free flowing after absorbing a liquid chemical additive therein. Examples of such porous solid materials include, but are not limited to, metal oxides, e.g., silica and alumina; metal salts of alumina-silicates, e.g., zeolites, clays and hydrotalcites; and others. Of the various particulate porous solid materials that can be used, particulate porous silica is preferred with precipitated silica being the most preferred.

The delayed release of a liquid chemical additive absorbed in particulate porous precipitated silica is by osmosis whereby the encapsulated liquid chemical diffuses through the porous solid material as a result of it being at a higher concentration within the porous material than its concentration in the liquid fluid outside the porous material. In order to further delay the release of a liquid chemical additive, the porous precipitated silica can be coated with a slowly soluble coating. Examples of suitable such slowly soluble materials which can be used include, but are not limited to, EDPM rubber, polyvinyldichloride (PVDC), nylon, waxes, polyurethanes, cross-linked partially hydrolyzed acrylics and the like. A more detailed description of the encapsulating techniques described above is set forth in U.S. Pat. No. 6,209,646 issued on Apr. 3, 2001 to Reddy et al., the disclosure of which is incorporated herein by reference thereto.

In order to strengthen the chemical casing formed in the well bore, one or more insoluble reinforcing materials can be included in the drilling fluid. The reinforcing materials become a part of the filter cake deposited on the walls of the well bore that cures into a hard and tough casing thereon. The presence of the reinforcing materials in the strong, hard and tough chemical casing provides additional strength to the chemical casing. The insoluble reinforcing materials which can be utilized include, but are not limited to, carbon fibers, glass fibers, mineral fibers, cellulose fibers, silica, zeolite, alumina, calcium sulfate hemihydrate, acrylic latexes, polyol-polyesters and polyvinyl butyral. Of these, fibrous materials or calcium sulfate hemihydrate are preferred. When used, the reinforcing material is included in the drilling fluid in an amount in the range of from about 2% to about 25% by weight of water in the drilling fluid, more preferably in an amount in the range of from about 5% to about 20% by weight of water and most preferably in an amount of about 10%.

As mentioned above, the drilling fluid can include other conventional drilling fluid additives which are known to those skilled in the art.

A combined method of this invention for both consolidating unconsolidated weak zones or formations formed of clays, shales, sand stone and the like to prevent sloughing and for forming a chemical casing in a well bore penetrating the weak zones or formations to improve the mechanical strength thereof and/or to provide zonal isolation while drilling the well bore is as follows. A well bore is drilled with a drilling fluid having a pH in the range of from about 6 to about 10, preferably 8. The drilling fluid is comprised of water, a polymeric cationic catalyst capable of accepting and donating protons which is adsorbed on the unconsolidated clays, shales, sand stone and the like, a water soluble or dispersible polymer which is cross-linked by a thermoset resin and causes the resin to be hard and tough when cured, a particulate curable solid thermoset resin, a water soluble thermoset resin and a delayed dispersible acid catalyst for curing the thermoset resins, the drilling fluid forming a filter cake on the walls of the well bore that cures and consolidates the unconsolidated weak zones and formations penetrated by the well bore so that sloughing is prevented and forms a hard and tough cross-linked chemical casing on the walls of the well bore.

The polymeric cationic catalyst in the drilling fluid is selected from the group consisting of polyethyleneimine, poly(dimethylaminoethylmethacrylate) and poly(dimethylaminopropylmethacrylate). Of these, polyethyleneimine is preferred. The polymeric cationic catalyst is included in the drilling fluid in an amount in the range of from about 1% to about 15% by weight of water in the drilling fluid, more preferably in an amount in the range of from about 2% to about 10% by weight of water and most preferably in an amount of about 6%.

The water soluble or dispersible polymer which is cross-linked by a thermoset resin utilized in the drilling fluid is selected from polymers containing one or more of hydroxyl, amide, carboxyl and epoxy functional groups. Examples of such polymers include, but are not limited to, acrylic latexes, polyvinylalcohol, polyvinylbutyral, polyesters, polyalkylacrylic acids, polyurethanes, acrylamide polymers, proteins, polyols and polysaccharides such as chitosan, hydroxyethylcellulose, carboxymethylhydroxyethylcellulose, water soluble starches, guar gum, xanthan gum, welan gum, carragenan gum and arabic gum. Of these, polysaccharides are preferred. The water soluble or dispersible polymer which is cross-linked by a thermoset resin is generally present in the drilling fluid in an amount in the range of from about 0.5% to about 20% by weight of water in the drilling fluid, more preferably in an amount in the range of from about 1% to about 10% by weight of water and most preferably in an amount of about 3%.

The particulate curable solid thermoset resin which preferably has a particle size in the range of from about 50 to about 1000 microns is selected from particulate solid melamine-formaldehyde type resins, urea-formaldehyde type resins or phenol-formaldehyde resins, and more preferably from particulate solid alkyl ethers of melamine-formaldehyde resins and particulate solid alkyl ethers of urea-formaldehyde type resins. Of these, particulate solid alkyl ethers of melamine-formaldehyde resins are preferred. The particulate curable solid thermoset resin is generally included in the drilling fluid in an amount in the range of from about 5% to about 50% by weight of water in the drilling fluid, more preferably in an amount in the range of from about 10% to about 30% by weight of water and most preferably in an amount of about 15%.

The water soluble thermoset resin is selected from the group consisting of water soluble alkyl ethers of melamine-formaldehyde resins, water soluble alkyl ethers of urea-formaldehyde resins and water soluble phenol-formaldehyde type resins. Of these, a water soluble alkyl ether of melamine-formaldehyde resin is preferred. The water soluble thermoset resin is included in the drilling fluid in an amount in the range of from about 5% to about 80% by weight of water in the drilling fluid, more preferably in an amount in the range of from about 20% to about 70% by weight of water and most preferably in an amount of about 50%.

The acid in the delayed acid catalyst in the drilling fluid is an organic or inorganic acid selected from the group consisting of p-toluene sulfonic acid, dinonylnaphthalene sulfonic acid, dodecyl benzene sulfonic acid, oxalic acid, maleic acid, hexamic acid, a copolymer of phthalic and acrylic acid, trifluoromethane sulfonic acid, phosphoric acid, sulfuric acid, hydrochloric acid, sulfamic acid and ammonium salts that produce acids when dissolved in water. Of these, ammonium chloride acid is preferred. The acid in the delayed acid catalyst utilized is generally present in the drilling fluid in an amount in the range of from about 0.5% to about 8% by weight of the thermoset resin in the drilling fluid, more preferably in an amount in the range of from about 1% to about 6% by weight of resin and most preferably in an amount of about 4%.

The drilling fluid can optionally include an insoluble chemical casing reinforcing material selected from the group consisting of carbon fibers, glass fibers, mineral fibers, cellulose fibers, silica, zeolite, alumina, calcium sulfate hemihydrate, acrylic latexes, polyol-polyesters and polyvinyl butyral. Of these, fibrous materials or calcium sulfate hemihydrate are preferred. When used, the insoluble reinforcing material is generally present in the drilling fluid in an amount in the range of from about 2% to about 25% by weight of water in the drilling fluid, more preferably in an amount in the range of from about 5% to about 20% by weight of water and most preferably in an amount of about 10%.

As mentioned above, the drilling fluid can also include conventional additives known to those skilled in the art.

Another method of consolidating unconsolidated weak zones or formations formed of clays, shales, sand stone and the like to prevent sloughing and forming a chemical casing in a well bore penetrating the weak zones or formations to improve the mechanical strength of the well bore and/or to provide zonal isolation while drilling the well bore is comprised of the steps of: (a) drilling the well bore with a drilling fluid having a pH in the range of from about 6 to about 10, preferably 8, and comprised of water, a polymeric cationic catalyst capable of accepting and donating protons which is adsorbed on the unconsolidated clays, shales, sand stone and the like, a particulate curable solid thermoset resin and a delayed acid catalyst for curing the solid resin, the drilling fluid forming a filter cake on the walls of the well bore that cures and consolidates the unconsolidated weak zones and formations penetrated by the well bore so that sloughing is prevented; and (b) contacting the well bore with a treating fluid comprised of water, a water soluble or dispersible polymer which is cross-linkable by a thermoset resin and causing the resin to be hard and tough when cured and a water soluble or dispersible thermoset resin, the treating fluid components depositing on the filter cake formed in step (a) and the thermoset resins curing into a hard and tough cross-linked chemical casing on the walls of the well bore.

The components in the drilling fluid and the treating fluid are the same as the components described above in connection with the preceding method.

The polymeric cationic catalyst is generally present in the drilling fluid in an amount in the range of from about 2% to about 25% by weight of water in the drilling fluid, more preferably in an amount in the range of from about 5% to about 20% by weight of water and most preferably in an amount of about 10%.

The particulate curable solid thermoset resin is generally present in the drilling fluid in an amount in the range of from about 5% to about 50% by weight of water in the drilling fluid, more preferably in an amount in the range of from about 10% to about 30% by weight of water and most preferably in an amount of about 15%.

The acid in the delayed acid catalyst is generally present in the drilling fluid in an amount in the range of from about 0.5% to about 8% by weight of the thermoset resin in the drilling fluid, more preferably in an amount in the range of from about 1% to about 6% by weight of water and most preferably in an amount of about 4%. The water soluble or dispersible polymer which is cross-linkable by a thermoset resin is generally present in the treating fluid in an amount in the range of from about 0.5% to about 20% by weight of water in the treating fluid, more preferably in an amount in the range of from about 1% to about 10% by weight of water and most preferably in an amount of about 3%.

The water soluble or dispersible thermoset resin is generally present in the treating fluid in an amount in the range of from about 5% to about 80% by weight of water in the drilling fluid, more preferably in an amount in the range of from about 20% to about 70% by weight of water and most preferably in an amount of about 50%.

The drilling fluid can optionally include a reinforcing material to strengthen the chemical casing as described above in connection with the preceding method. When used, the reinforcing material is generally included in the drilling fluid in an amount in the range of from about 5% to about 50%, more preferably in an amount in the range of from about 10% to about 30% by weight of water and most preferably in an amount of bout 15%.

As mentioned, the drilling fluid can also include conventional additives known to hose skilled in the art.

A preferred method of consolidating unconsolidated weak zones or formations formed of clays, shales, sand stone and the like while drilling a well bore penetrating the zones or formations to prevent sloughing is comprised of drilling the well bore with a drilling fluid having a pH of about 8 and comprised of water, a cationic polyethyleneimine catalyst which is adsorbed on the unconsolidated clays, shales, sand stone and the like present in the drilling fluid in an amount in the range of from about 2% to about 10% by weight of water in the drilling fluid, a polysaccharide polymer which is capable of being cross-linked by a thermoset resin and causing the resin to be hard and tough when cured present in an amount in the range of from about 1% to about 10% by weight of water in the drilling fluid and an alkyl ether of a melamine-formaldehyde thermoset resin which cross-links the polymer, is catalyzed and cured by the catalyst and consolidates the weak zones or formations so that sloughing is prevented present in the drilling fluid in an amount in the range of from about 20% to about 70% by weight of water in the drilling fluid.

Another preferred method of consolidating unconsolidated weak zones or formations formed of clays, shales, sand stone and the like while drilling a well bore penetrating the zones or formations to prevent sloughing comprises the steps of: (a) drilling the well bore with a drilling fluid having a pH of about 8 and comprised of water, a cationic polyethyleneimine catalyst which is adsorbed on the unconsolidated clays, shales, sand stone and the like present in the drilling fluid in an amount in the range of from about 2% to about 10% by weight of the drilling fluid; and then (b) contacting the well bore with a treating fluid having a pH of about 8 comprised of water, a polysaccharide polymer which is capable of being cross-linked by a thermoset resin and causing the resin to be hard and tough when cured present in an amount in the range of from about 1% to about 10% by weight of water in the treating fluid and an alkyl ether of a melamine-formaldehyde thermoset resin which cross-links the polymer, is catalyzed and cured by the catalyst and consolidates the weak zones or formations so that sloughing is prevented present in an amount in the range of from about 20% to about 70% by weight of water in the treating fluid.

A preferred method of this invention for forming a chemical casing in a well bore to improve the mechanical strength thereof and provide zonal isolation while drilling the well bore is comprised of drilling the well bore with a drilling fluid having a pH of about 8 and comprised of water, a water soluble or water dispersible polymer which is capable of being cross-linked by a thermoset resin and causing the resin to be hard and tough when cured present in the drilling fluid in an amount in the range of from about 1% to about 10% by weight of water in the drilling fluid, a particulate curable solid alkyl ether of a melamine-formaldehyde thermoset resin present in the drilling fluid in an amount in the range of from about 10% to about 30% by weight of water in the drilling fluid, a water soluble alkyl ether of a melamine-formaldehyde thermoset resin present in the drilling fluid in an amount in the range of from about 20% to about 70% by weight of water in the drilling fluid, and a dispersible delayed ammonium chloride acid catalyst for curing the solid thermoset resin and the water soluble thermoset resin present in the drilling fluid in an amount in the range of from about 1% to about 6% by weight of thermoset resin in the drilling fluid, the drilling fluid forming a filter cake on the walls of the well bore that cures into a hard and tough cross-linked chemical casing thereon.

A preferred method of consolidating unconsolidated weak zones or formations formed of clays, shales, sand stone and the like to prevent sloughing and forming a chemical casing in a well bore penetrating the weak zones or formations to improve the mechanical strength thereof and/or to provide zonal isolation while drilling the well bore is comprised of drilling the well bore with a drilling fluid having a pH of about 8 and comprised of water, a cationic polyethyleneimine catalyst which is adsorbed on the unconsolidated clays, shales, sand stone and the like present in an amount in the range of from about 2% to about 10% by weight of water in the drilling fluid, a water soluble or dispersible polysaccharide polymer which is cross-linkable by a thermoset resin and causes the resin to be hard and tough when cured present in the drilling fluid in an amount in the range of from about 1% to about 10% by weight of water in the drilling fluid, a particulate curable solid alkyl ether of melamine-formaldehyde thermoset resin present in an amount in the range of from about 10% to about 30% by weight of water in the drilling fluid, a water soluble alkyl ether of melamine-formaldehyde thermoset resin present in an amount in the range of from about 20% to about 70% by weight of water in the drilling fluid and a dispersible delayed ammonium chloride acid catalyst for curing the thermoset resins present in the drilling fluid in an amount in the range of from about 1% to about 6% by weight of thermoset resin in the drilling fluid, the drilling fluid forming a filter cake on the walls of the well bore that cures and consolidates the unconsolidated weak zones and formations penetrated by the well bore so that sloughing is prevented and forms a hard and tough cross-linked chemical casing on the walls of the well bore.

Another preferred method of consolidating unconsolidated weak zones or formations formed of clays, shales, sand stone and the like to prevent sloughing and forming a chemical casing in a well bore penetrating the weak zones or formations to improve the mechanical strength of the well bore and/or to provide zonal isolation while drilling the well bore is comprised of the steps of: (a) drilling the well bore with a drilling fluid having a pH of about 8 and comprised of water, a cationic polyethyleneimine catalyst which is adsorbed on the unconsolidated clays, shales, sand stone and the like present in an amount in the range of from about 2% to about 10% by weight of water in the drilling fluid, a particulate curable solid alkyl ether of melamine-formaldehyde formaldehyde thermoset resin present in an amount in the range of from about 10% to about 30% by weight of water in the drilling fluid and a delayed ammonium chloride acid catalyst for curing the solid resin present in the drilling fluid in an amount in the range of from about 1% to about 6% by weight of thermoset resin in the drilling fluid, the drilling fluid forming a filter cake on the walls of the well bore that cures and consolidates the unconsolidated weak zones and formations penetrated by the well bore so that sloughing is prevented; and (b) contacting the well bore with a treating fluid comprised of water, a water soluble or dispersible polysaccharide polymer which is capable of being cross-linked by a thermoset resin and causing the resin to be hard and tough when cured present in the treating fluid in an amount in the range of from about 1% to about 10% by weight of water in the treating fluid, a water soluble or dispersible alkyl ether of melamine-formaldehyde thermoset resin present in the treating fluid in an amount in the range of from about 20% to about 70% by weight of water in the treating fluid, the treating fluid components depositing on the filter cake formed in step (a) and the thermoset resins curing into a hard and tough cross-linked chemical casing on the walls of the well bore.

In order to further illustrate the methods of this invention, the following examples are given.

EXAMPLE 1

The application of catalyzed polyethyleneimine and melamine-formaldehyde resin on various mineral surfaces typically encountered during drilling such as clays, shales, sand stone and the like, was studied in the laboratory. It was found that strongly adsorbed catalysts or activator components on the mineral surfaces of a formation catalyze the curing of the resin upon contact, consolidate the formation and form a chemical casing on the well bore surface.

Bentonite was chosen as a representative swelling clay, and kaolin as a representative non-swelling clay. Silica flour was chosen as a model for a sand stone formation. Ground Pierre shale was used as a typical shale model. A typical procedure for adsorption measurements using bentonite as the mineral is given below.

In a round bottom flask, 10 grams of bentonite were added to 90 grams of an aqueous solution containing 10% polyethyleneimine (PEI) with stirring at room temperature. The pH of the PEI solution was adjusted when necessary with hydrochloric acid prior to mixing with bentonite. Aliquots of the suspension were taken periodically and centrifuged. The solids in the aliquots were isolated and dried at 100° C. for 3–4 hours. The amount of adsorbed material was measured by Thermal Gravimetric Analysis (TGA). The results are presented as Experiment #1 in Table 1. In subsequent experiments, variations to the above procedure were made, and the results are presented in Table 1.

TABLE 1

| Experiment # | Adsorbent | Polymer | Polymer Conc., % | Salt (KCl) Conc., % | pH | % Adsorbed in 1 hr. | % Adsorbed in 3 hrs. | % Adsorbed in 5 hrs. | % Adsorbed in 24 hrs. |
|---|---|---|---|---|---|---|---|---|---|
| 1 | Bentonite | PEI | 10 | — | 10 | 18.08 | 18.5 | 18.1 | 18.2 |
| 2 | Bentonite | PEI | 10 | — | 9 | 12.2 | — | 16.4 | 16.6 |
| 3 | Bentonite | PEI | 5 | — | 9 | 12 | — | 10.8 | 15.6 |
| 4 | Bentonite | PEI | 1 | — | 9 | 7.3 | — | 9 | 9.6 |
| 5 | Bentonite | PEI | 5 | — | 8 | 14.1 | — | — | — |
| 6 | Bentonite | PEI | 10 | 2 | 10.5 | 15 | 15 | 15 | 16 |
| 7 | Bentonite | PEI | 10 | 7 | 10.5 | 13.3 | 13.6 | 13.6 | 13.3 |
| 8 | Kaolin | PEI | 10 | — | 10.5 | 6 | — | — | 9.6 |
| 9 | Shale | PEI | 10 | — | 9 | 5.2 | — | — | 6 |
| 10 | Bentonite | Resin[1] | 30 | — | — | 22 | Note 2 | Note 2 | Note 2 |
| 11 | Bentonite | Resin[1] | 10 | — | — | 9.8 | Note 2 | Note 2 | Note 2 |
| 12 | Bentonite | gum[3] + PEI | 0.3% gum[3] in 5% PEI solution | — | 9.3 | 15.1 | — | 13.8 | 16.3 |
| 13 | Silica flour | PEI | 1 | — | 9.3 | 0.43 | — | 1.92 | — |
| 14 | Silica flour | PEI | 5 | — | 9.3 | 7.3 | — | 10.7 | — |

[1]hexamethylolmelamine partially prepolymerized and available from Borden Chemical of Columbus, Ohio under the trade name "CASCO MEL MF 600 ™".
[2]The mixture was pasty. The solids could not be separated from the aqueous phase.
[3]xanthan gum.

From Table I it can be seen that PEI solutions at 10% concentration with bentonite at pH 10 reached a maximum adsorption of about 18% within one hour and remained constant over 24 hour period. In the presence of KCl, the maximum adsorbed amount decreased to about 15% at 2% KCl, and to about 13% at 7% KCl.

A decrease of pH appears to decrease the amount of PEI adsorbed. This seems to indicate that oxyanionic sites on the bentonite surfaces are being protonated which will decrease ionic type of association and increase weaker H-bonded associations.

Decreasing the concentration of PEI to 5% or 1% increased the time to maximum adsorption as expected. However, the plateau adsorption level remained in the 17–18% range. At 1% PEI, all the PEI in solution was adsorbed onto the bentonite surface (100% theoretical). Based upon calculations, it is predicted that there will be 100% PEI adsorption from solutions with concentrations up to 2.3% to attain the maximum adsorption levels of 17–18% on bentonite.

Various adsorbents were tested for their adsorption capabilities for PEI. Bentonite adsorbs the most (~18%), followed by Kaolin (~10%), silica (11%) and shale 6%). It should be noted that the surface areas for different adsorbents were not held constant.

Experiments with melamine-formaldehyde solutions at their native pH values reached one hour adsorption levels 22% from a 30% solution, and 10% from a 10% solution. Long term adsorptions (24 hr.) measurements were not possible because of the difficulties encountered in centrifuging the samples.

The presence of xanthan gum in the solution, even though in small amounts seemed to accelerate the rate of PEI adsorption thus facilitating attainment of plateau adsorption faster.

EXAMPLE 2

A drilling fluid was prepared by dissolving in a blender various amounts of xanthan gum (available from Baroid Drilling Fluids under the trade name "BARAZAN® D PLUS") in 350 ml of deionized water and adjusting the pH to 9.3 with sodium hydroxide. The resulting solutions had yield points of 1.75, 1.65, 1.1 and 1 pounds per 100 square feet.

A small block of Pierre shale stored in a sealed environment was crushed and the material collected on a U.S. Standard Sieve Series No. 12 mesh screen after passing through No. 6 mesh sieve. The above described drilling fluid containing the test sample dissolved in 350 grams of deionized water was rolled for one hour at 150° F. Into the hot fluid, 30 grams of sized shale was added and rolled at 150° F. for 16 hours. The mixture was filtered through a 14 mesh screen, the retained solids washed with tap water, dried under vacuum at 80° C. for 3 hours and weighed. The % ratio of lost weight to original weight is defined as the % shale erosion.

The results for different test materials are presented in Table 2.

showed excellent shale erosion inhibition. The pH of PEI solution is in the highly alkaline range (~10.5), and even at this high pH, there is approximately 4% protonated nitrogens, whereas at a pH of 8 there is 25% protonation. Shale erosion tests with PEI (at 3–5% polymer concentration) in the presence of xanthan gum showed erosion values in the range of 5–10%. At 10% PEI concentration without xanthan gum, the erosion value was about 2%. Other polymers containing pendant amino groups, for example poly(dimethylaminoethylmethacrylate) or a copolymer of dimethylaminoethylmethacrylate and N-vinylpyrrolidone, also provided excellent shale erosion inhibitions especially at pH values near 8.0. At pH values near 9.3 the erosion was substantial suggesting the importance of the protonated form of these polymers in inhibiting shale erosion.

EXAMPLE 3

The ability of the compositions of the present invention to reduce pressure transmission from the well bore fluids and prevent drilling fluid penetration into the shale by forming an impenetrable film at the shale/well bore interface is shown by means of pore pressure transmission tests designed to measure fluid pressure transmission across a shale sample. The tests are described as follows.

The Shale sample plugs were cored perpendicular to bedding from a large well preserved Pierre II shale cylindrical block. An inert mineral spirit was used as the coring fluid. The plugs were kept immersed in the mineral spirit until testing. The plugs (nominal diameter of 25 mm) were cut into required lengths (approximately 10 mm) with a diamond-plated saw. The flatness of the end surfaces and perpendicularity of circumferential surfaces to the end surfaces were checked.

The test apparatus utilized was equipped with a test solution cylinder for each test solution, high pressure gas cylinders to provide upstream (to simulate pressure due to well bore drilling fluid) pressure and down stream (to simulate pressure due to formation fluid) pressure. The confining pressure was applied with a Haskell pump. The test was started by bleeding the top (downstream) and bottom (upstream) platens with simulated pore fluid (12% NaCl solution). The shale sample was placed between the platens, and the assembly was jacketed in a 1.0 mm thick

TABLE 2

| Experiment # | #1 | #2 | #3 | #4 | #5 | #6 | #7 | #8 | #9 | #10 | #11 | #12 | #13 | #14 |
|---|---|---|---|---|---|---|---|---|---|---|---|---|---|---|
| Drilling Fluid, ppb[1] | 0 | 1.75 | 1.1 | — | — | 1 | 1 | 1.65 | 1 | — | 1.1 | — | — | — |
| PEI, ppb[1] | — | — | — | 10 | 1 | 5 | 5 | 3 | — | — | — | — | — | — |
| Resin[2], wt % | — | — | — | — | — | — | — | — | — | 30 | 10 | — | — | — |
| Poly(DMAEMA)[3], wt % | — | — | — | — | — | — | — | — | — | — | — | 1 | — | — |
| Poly(DMAEMA/NVP)[4], wt % | — | — | — | — | — | — | — | — | — | — | — | — | 1 | — |
| pH | 9.3 | 9.4 | 9.3 | 9.3 | 9.3 | 9.3 | 8.0 | 9.3 | 9.2 | 9.3 | 9.2 | 8.0 | 8.0 | 9.3 |
| Yield point, lb/100 ft[2] | 0 | 20 | 10.3 | — | — | 10.9 | 11.9 | 11.4 | 0.9 | 1.6 | 8.5 | 2.0 | 3.0 | 1.4 |
| % Erosion | 81 | 29 | 26 | 1.9 | 18 | 5.2 | 4.6 | 9.2 | 31 | 1.7 | 10 | 4 | 3 | 100 |

[1]pounds per barrel of xanthan gum in deionized water
[2]hexamethylolmelamine partially prepolymerized and available from Borden Chemical of Columbus, Ohio under the trade name "CASCO MEL MF 600 ™".
[3]Poly(dimethylaminoethylmethacrylate)
[4]Poly(dimethylaminoethylmethacrylate-co-N-vinylpyrrolidone)

Deionized water containing xanthan gum with the pH adjusted to 9.3 showed an erosion of 81%, whereas solutions containing 1.75 and 1.1 ppb showed erosion in the 29% and 26% range, suggesting that xanthan polymer is a mild shale erosion inhibitor. Surprisingly, polyethyleneimine (PEI)

membrane. O-Rings were mounted over the jacket on the platens. The assembly was mounted in the test cell, and a confining pressure of 20 MPa was applied with water. A back pressure (upstream) of 10 MPa was applied and checked for flow across the upstream platen. When the downstream pressure had stabilized at 10 MPa (pressure change<50 kPa/hour, i.e., the sample was consolidated), the upstream pressure was increased to 15 MPa. When the downstream pressure increased by approximately 2 MPa, the upstream pressure was decreased to 10 MPa. After the down stream pressure stabilized at 10 MPa, the sample was reconsolidated. Then the pore fluid at the upstream end was displaced with the test solution at 15 MPa. When the down stream pressure was stabilized, the test solution was displaced at the upstream end with a lower activity solution (saturated ammonium chloride solution). The test was terminated when a maximum decrease in the downstream pressure was observed.

In order to simulate a two stage exposure of the formation to the components of the present invention, the shale sample was initially exposed for 3 hours to a test fluid containing 3% PEI, the pH of which was adjusted to 8.0 with hydrochloric acid. At the end of 3 hours, the PEI solution was flushed with the simulated pore fluid at the same pressure (15 MPa), followed by a 70% aqueous melamine-formaldehyde resin (available from Borden Chemicals of Columbus, Ohio under the trade name "ASTRO MEL CRI™") solution. The core was exposed to the resin solution for 3 hours, at the end of which the resin solution was flushed sequentially with simulated pore fluid followed by saturated ammonium chloride solution. After 24 hours, the ammonium chloride solution was replaced with simulated pore fluid followed by a 3% PEI solution containing 12% NaCl. The PEI/brine solution was allowed to stay in contact with the core until the downstream pressure stabilized. All the testing was performed at room temperature.

Based on the downstream pressure change during the pressure transmission change, it was concluded that the downstream pressure increase during the test solution pressure transmission stage was significantly lower than that of the pore pressure transmission stage. In addition, the final downstream pressure at the end of the test solution pressure transmission stage was significantly lower than that of the pore fluid pressure transmission change. The results strongly suggest that the reaction between PEI and the resin in the presence of ammonium chloride on the shale surface/pores resulted in the formation of an impermeable barrier which significantly reduced the rate of pressure transmission into the shale.

When the above experiment was repeated by leaving out the resin solution, the downstream pressure during, as well as at the end, of the test solution pressure transmission stage, as well as at the end of the pore pressure transmission stage, was identical to the upstream pressure suggesting that the reaction product between the resin and PEI in the presence of ammonium chloride was responsible for preventing the pore fluid pressure transmission in the first experiment.

EXAMPLE 4

In this example, experiments were designed to demonstrate the effectiveness of the compositions of the present invention in consolidating loose sand encountered while drilling through immature and young sand stone formations under geopressurized conditions. For example when geopressure is encountered above the depth at which the surface casing would be normally set or before the conventional blowout preventer (BOP) stack and riser are installed, the operator has two options: 1) drill into the geopressure without the conventional pressure-containment system, or 2) set surface casing shallower than normal. Either option introduces problems to the drilling operation. If the incompetent sand stone formation could be consolidated such that the high permeability of the formation was blocked to prevent the flow of formation fluids into the well bore, and at the same time increase the mechanical integrity and strength of the formation, the drilling operation could continue uninterrupted.

A method of evaluating the sand consolidation ability of resin compositions is as follows. A blend of sand was prepared by mixing 94 parts Oklahoma #1 sand of about 70–170 mesh and 6 parts silica flour (particle size smaller than about 200 mesh), and the dry blend was mixed with 0.3 ml of API brine. This blend (100 grams) was packed into a TEFLON® polymer lined test chamber (2.38 cm I.D) or a Hassler Sleeve test chamber (2.38 cm I.D) with a pad of Oklahoma #1 sand on the bottom and a sand pad of 20–40 mesh on top of the sand pack column. A 110 gram solution of 4.7% PEI in water with pH adjusted to 8.25 with hydrochloric acid was mixed with 45 grams of melamine-formaldehyde resin ("ASTRO CR1™" resin from Borden Chemical) and the resulting solution was passed through the dry sand pack core at room temperature under a pressure of 20 psi. The sand pack assembly was separated from the rest of the set up, and kept in an oven maintained at 180° F. for 24 hours. The sand pack assembly was cooled to room temperature and the core was removed by pushing it out of the TEFLON®Sleeve. If the core when gently pressed between fingers did not crumble, it was determined that the core was consolidated due to the cured resin composition. The same procedure was followed for Experiment numbers 3–8 with the changes to the composition mentioned in Table 3. For experiment #2, a 5% PEI solution was passed through the dry column first followed by a 30% solution of melamine-formaldehyde resin in water. The heat treatment of the sand pack assembly was the same as described above. For Experiment #8, a 3% PEI solution was passed through the column first followed by a 50% melamine solution.

Consolidated sand pack cores from Experiments #7 and #8 were submitted for mechanical property evaluation using a Load Frame.

TABLE 3

| Experiment # | Xanthan gum, wt % in water | Resin, wt % in total composition | PEI, % by wt of total composition | Catalyst Type | Catalyst Amount, % | PH (solution) | Sand Pack Consolidation (Yes/No) | Compressive Strength of Sand Pack, psi | Young's Modulus, psi | Poisson's Ratio |
|---|---|---|---|---|---|---|---|---|---|---|
| 1 | None | 29 | 4.7 | HCl | to adjust pH | 8.25 | Yes | Not tested | Not tested | Not tested |
| 2[2] | None | 29 | Two stage treat (5% PEI solution first) | HCl | Adsorbed PEI.HCl salt | 8.25 for PEI sol.; Resin sol. pH as is | Yes | Not tested | Not tested | Not tested |
| 3 | None | 29 | 4.7 | None | None | 10.8 | No | — | — | — |
| 4 | None | 50 | None | NH$_4$Cl | 3 | 6.9 | Yes | Not tested | — | — |
| 5 | None | 50 | 3 | HCl | to adjust pH | 8.25 | Yes | Not tested | Not tested | Not tested |

TABLE 3-continued

| Experiment # | Xanthan gum, wt % in water | Resin, wt % in total composition | PEI, % by wt of total composition | Catalyst Type | Catalyst Amount, % | PH (solution) | Sand Pack Consolidation (Yes/No) | Compressive Strength of Sand Pack, psi | Young's Modulus, psi | Poisson's Ratio |
|---|---|---|---|---|---|---|---|---|---|---|
| 6 | 0.18 | 50 | 1.5 | HCl | to adjust pH | 8.25 | Yes | Not tested | Not tested | Not tested |
| 7 | 0.16 | 50 | 1.5 | PTSA[1] | to adjust pH | 8.02 | Yes | 3640 (average) | 0.3880e+6 | 0.176 |
| 8[2] | 0.16 | 50 | Two stage treatment (3% PEI sol. first) | HCl | Enough to adjust pH | 8.02 | Yes | 2300 (average) | 0.4430e+6 | 0.224 |

[1]para-toluenesulfonic acid,
[2]The sand pack composition was changed to 93% Oklahoma #1 sand, 6% silica flour and 1% bentonite The results presented in Table 3 show that the resin compositions of the present invention can consolidate the loose sand and provide mechanical strength to the consolidated sand. The resin composition comprising the resin and the adsorbing catalyst can be present together in the drilling fluid, or the sand consolidating process can be carried in two stages, the first stage involving only the catalyst in the drilling fluid and the second stage involving the resin in a treating fluid.

EXAMPLE 5

The formation consolidating capability, and the permeability reducing ability of the resin compositions of the present invention are demonstrated by using the general experimental set up described in Example 3 with the modifications that included replacement of TEFLON® polymer liner with a rubber Hassler sleeve and the sand pack being a Brown sand stone core.

The Brown sand stone core was conditioned with 4% potassium chloride solution and the initial permeability of the sand stone was measured. A treatment solution was prepared by dissolving 3.14 grams of xanthan gum in 925 grams of water to which 75 grams of a 40% solution of PEI in water were added. 500 grams of the solution was mixed with 500 grams of melamine-formaldehyde resin and the pH of the mixture was adjusted to 8.0 with hydrochloric acid. A flow apparatus was fitted with a dry core and flushed with a 3% PEI solution at pH 8.0 against a back pressure of 100 psi. This was followed by the resin solution prepared as described above at 150 psi against a back pressure of 100 psi. After passing about 3–4 pore volumes of the resin solution the experiment was stopped, the core assembly was separated and cured at 180° F. for 24 hours. The set up was reassembled and the permeability of the treated core to 4% potassium chloride solution was measured. The apparatus was disassembled, the core was taken out and submitted for mechanical property measurement. Another core was treated with identical resin solution with the exception that p-toluenesulfonic acid was used to adjust the pH to 8.0. The results are shown in Table 4.

TABLE 4

| Experiment # | Resin Treatment Composition | Initial Permeability in Darcies | Permeability Reduction, % after treatment | CS[1] of Control Core, psi | CS[1] of Treated Core, psi | Young's Modulus, Control, psi | Young's Modulus, Treated, psi | Poisson Ratio, Control | Poisson Ratio, Treated |
|---|---|---|---|---|---|---|---|---|---|
| 1 | Note 2 | 3 | >99.7 | 3000 | 5180 | 1.54e+6 | 3.08e+6 | 0.277 | 0.278 |
| 2 | Note 3 | 3 | >99.7 | Same as above | 5110 | Same as above | 2.90 | Same as above | 0.321 |

[1]Compressive strength
[2]50:50 mixture of melamine-formaldehyde resin ("ASTRO MEL CR1 ™") and an aqueous solution containing 3% PEI and 0.314% xanthan gum at pH 8.0 adjusted with hydrochloric acid.
[3]Same as the composition in Note #2 except that p-toluenesulfonic acid is used to adjust pH.

The results in Table 4 clearly show the resin composition not only blocks the permeability of the treated zones of the formation but also strengthens the formation by increasing the compressive strengths and Young's Modulus of the rock. The results clearly show that the inflow of formation fluids into a well bore can be prevented resulting in a complete zonal isolation conventionally achieved by casing the well followed by cementing behind the casing. The consolidated rock showed strengths similar to those for a cement column behind a casing.

EXAMPLE 6

The flow of formation fluids into a well bore during drilling is traditionally avoided by using drilling fluids which can exert a high enough hydrostatic pressure to hold back the formation fluids without fracturing the formation. As drilling is performed at increased depths, the density of the drilling fluids must be increased to compensate for increased formation pore pressures at such depths. The increased mud density would fracture the formations in the shallow zones of the well if they are not cased prior to increasing drilling fluid density. The number of casings required could be decreased if the previously drilled zones were strengthened while drilling. The pressure exerted by the drilling fluid on the well bore walls depends on the height of the drilling fluid column as well as the density of the fluid. Experiments were designed in this example to simulate a well bore containing a fluid column and its ability to withstand increased fluid pressure after resin treatment. The experiments were designed to demonstrate the effects of only the formation consolidation, the formation consolidation in combination with a chemical casing on the well bore wall and only the chemical casing on the well bore wall.

General Procedure and Experimental Set Up

A well bore model was prepared by drilling a 1¾" (diameter)×3½" (length) cylindrical core from a block of a Brown sand stone or of a Berea sand stone. A hole of ¾" diameter was drilled in the center of the core. The cylindrical was dried in an oven overnight at 200° F., cooled to room temperature and surface ground on top and bottom prior to use.

The experimental set up consisted of the core chamber made from a 2" stainless steel tubing collar modified by welding a flat plate on the bottom of the collar. A ¼" nipple was then fitted and welded into a hole in the center of the flat plate. The protruding portion of the nipple also served to centralize the core by extending into the hole of the cylindrical core. A compression ¼" fitting was then used for entrance into the cell. The top of the chamber employed a modified 2" hexagonal plug drilled for a ¼" pipe fitting which was fitted with a plug. An exit port was added to the top side portion of the chamber to allow for fluid that has been passed through the core to exit from the chamber. A ¼" steel tube connected the exit port to a back pressure regulator. A nitrogen-capped fluid chamber was connected to the core chamber from the bottom via ¼" steel tubing.

The set up was assembled by placing a rubber gasket with a hole in the center on the inside bottom of the core chamber. The core was placed on top of the gasket. Another rubber gasket with a hole in the center was placed on top of the core. The hexagonal lid was fitted tightly on the core chamber. The core chamber was connected to the resin reservoir from the bottom with the tubing provided with a shut off valve. The exit port was connected to the back pressure regulator with a metal tubing provided with a shut off valve. A treating fluid was then placed in the reservoir; pressurized with 70 psi nitrogen and allowed to enter the bottom of the core chamber, to be forced up through the bottom of the core, into the bore hole and then to exit through the top of the core chamber against a back pressure of 50 psi. Generally, when the treating fluid was solids-free, at least 5–10 pore volumes of the treating fluid was collected before either switching to a second fluid or terminating the experiment. In the case of multiple stage treatments, after the first fluid was passed through the core, the reservoir and the tubing leading up to the core chamber was isolated from the core chamber, cleaned and charged with the second fluid, and the operation continued as described. In the case of a Berea core, a 4% KCl solution was passed through the core to stabilize the clay prior to flowing the test solution. When the treating fluids contained solids for the purpose of building a curable filter cake or "chemical casing", the flow was continued either for one hour or until the flow completely stopped. All the core flow experiments were performed at room temperature. After the experiments, the set up was disassembled, the core was taken out, wrapped in an aluminum foil and rolled in an oven at 160° F. for 24 hours. The core was cooled to room temperature and submitted for burst strength evaluation.

The burst strength evaluation of the treated core was performed using an MKS Loading Frame. The cylinder was mounted with an overburden pressure of 400 psi under unconfined conditions on the platform of the equipment with rubber gaskets each containing holes in the center on top and bottom of the core. Either mineral oil or xanthan solution was used to pressurize the sample from inside. The fluid pressure at which the core fractured was taken as the burst pressure of the core.

Burst Strengths for Control Cores

The permeabilities of Brown sand stone and Berea cores were plugged by treatment of the cores with a mixture of sodium silicate solution (38% in water, N Grade or Grade 40) sold as Injectrol A by Halliburton and a sodium acid pyrophosphate solution sold as MF-1 by Halliburton. It is believed that the silicate gels formed from this mixture will plug the core permeability without strengthening the core. The treatment mixture was prepared by adding a solution of 36 grams of MF-1 in 500 ml water to a solution of 175 ml of Injectrol A in 325 ml water. After treating the core, the core was left at room temperature for 24 hours, and subjected to burst strength tests.

Burst strengths of 160 and 0 psi were obtained with Brown sand stone cores using oil and water as the pressurizing fluids respectively. A burst strength of 230 psi was obtained for Berea core under the same conditions using water as the pressurizing fluid.

Formation Consolidation

Generally, these studies were done in a two-stage process, the first stage involved passing 3% PEI (polyethyleneimine) solution adjusted to pH 8.2, through the core followed by an aqueous solution containing 50% resin and 0.55% xanthan gum by weight of the total solution. Generally the pH of the PEI solution was adjusted with HCl, and when specified, with p-toluenesulfonic acid (ptsa). Two typical procedures are described below.

Procedure A (One-Stage Treatment): A 3% aqueous solution of polyethyleneimine (PEI) was prepared by dissolving 37.50 grams of a 40% active solution in 462.5 grams of deionized water or a xanthan polymer solution. The xanthan solution was prepared by adding 1.6 grams xanthan gum to 500 grams deionized water followed by rolling the solution in a rolling oven at 150° F. for 18 hours. The pH of the solution was adjusted with hydrochloric acid or, when specified, with para-toluenesulfonic acid (ptsa). Into this solution was dissolved 500 grams of melamine-formaldehyde liquid resin or, when specified other resins to prepare a 50% resin solution. The resulting solution was used in treating the core as described in the General Procedure. P Procedure B (Two-Stage Treatment): In this procedure the core was first treated with the 3% PEI solution prepared as described above. In a follow-up stage, a xanthan solution, prepared as described above, containing the resin in the specified concentration was used to treat the core. The results from this study are presented in Table 5.

TABLE 5

| Experiment # | Core Type[1] | Fluid Composition | pH | Procedure | Fluid For Burst Strength | Burst Strength, psi |
|---|---|---|---|---|---|---|
| 1 | BSS | 3% PEI in 0.32% xanthan solution (Stage 1); 50% resin in 0.32% xanthan solution (Stage 2) | $8.2^2$ | B | Oil | 335 |
| 2 | BSS | Same as #1 without xanthan in both the stages | $8.2^2$ | B | Oil | 0 |
| 3 | BSS | Same as #1 | $8.2^3$ | B | Oil | 350 |
| 4 | BSS | Same as #1 | $8.2^3$ | B | Water | 160 |

TABLE 5-continued

| Experiment # | Core Type[1] | Fluid Composition | pH | Procedure | Fluid For Burst Strength | Burst Strength, psi |
|---|---|---|---|---|---|---|
| 5 | BSS | Same as #2 | 8.2[3] | B | Water | 0 |
| 6 | BSS | Same as #1[4] | 8.2[3] | B | Water | 250 |
| 7 | BSS | Same as #1 except resin concentration was increased to 70% | 8.2[3] | B | Water | 520 |
| 8 | BSS | Same as #7 except that 0.2% Silquest[5] | 8.2[3] | B | Water | 560 |
| 9 | BSS | Same as #1 except no xanthan in Stage 2 | 7.5[3] | B | Oil | 390 |
| 10 | BSS | Same as #1 | 7.8[3] | B | Oil | 450 |
| 11 | Berea | Same as #1 | 8.25[3] | B | Oil | 1070 |
| 12 | Berea | Same as #1 | 8.25[3] | B | Water | 625 |
| 13 | BSS | Same as #1 except a different resin[6] was used | 8.2[3] | B | Oil | 240 |
| 14 | BSS | Same as #1 except a different resin[7] was used | 8.2[3] | B | Oil | 360 |
| 15 | BSS | 3% PEI in 0.32% xanthan solution + Resin in water 1:1 wt ratio | 8.2[3] | A | Oil | 530 |

[1]BSS—Brown sand stone
[2]Para-toluenesulfonic acid was used to adjust pH (PTSA)
[3]Hydrochloric acid was used to adjust pH
[4]Cured at 190° F. for 24 hours
[5]N-beta-(aminoethyl)-gamma-aminopropyltrimethoxysilane available from Osi Specialties Division of Witco Corp., Greenwich, Connecticut
[6]"ASTRO Mel 400 ™" available from Borden Chemical. This melamine-formaldehyde resin contained less free methylol groups and higher levels of methoxy methyl groups than in "ASTRO MEL CR1 ™" also from Borden Chemical.
[7]"ASTRO MEL NW 3A ™" obtained from Borden Chemical. This melamine-formaldehyde resin contained less free imino groups than in "ASTRO MEL CR1 ™", but more free imino groups than in "ASTRO MEL 400 ™"

The results in Table 5 indicate that the compositions of the present invention increase the burst strength of the formation such that it can withstand increased drilling fluid pressure. The importance of the polymer for improving the strength of the formation is evident from Experiments 1 and 2 which show that a polysaccharide, such as xanthan, in combination with the resin increases the burst strength. The results also show that increasing the resin concentration, higher curing temperatures, lower pH values increase the formation strength. The results also show that all the components of the invention can be added to the drilling fluid or they can be used in a staged process. Lower permeability formations, for example Berea sand stone, provide higher burst strengths compared to the higher permeability formations, for example Brown sand stone.

Formation Consolidation With Concurrent Chemical Casing On Well Bore

As mentioned earlier, this process typically involved either a one or two-stage process. In the first stage, a 3% PEI solution in deionized water was pumped into the core. In the case of Berea cores, a 4% KCl solution was passed through the core prior to the PEI solution. The second stage treatment included a xanthan solution containing dissolved melamine-formaldehyde resin (50–70%), as well as suspended resin particles (15% by weight of total solution). Two types of solid materials made from melamine-formaldehyde resins with different particle sizes were tested. Two solid urea-formaldehyde resins with different particle sizes were also tested. To facilitate the curing of the solid resin particles, either encapsulated or non-encapsulated ammonium chloride in different amounts was added. Approximately, 2–4 mm thick filter cake was formed on the core surface in these experiments.

Procedure C (Two-Stage Treatment): In the first stage the high permeability core was treated with 3% PEI solution adjusted for pH. In the second stage, a 50% resin dissolved in a xanthan solution (1.1 pounds per barrel) and containing 15% solid melamine-formaldehyde resin, AC Molding Chemical "M2125™" or "GM2125™", by weight of the solution was used to treat the core. The rest of the procedure is the same as described above in the general procedure. The effect of the inclusion of encapsulated and non-encapsulated ammonium chloride was tested for different formulations. In all cases, a filter cake of 1–4 mm thick was formed.

Procedure D (Modified Two-Stage Treatment): In the first stage, the treatment consisted of core treatment with a suspension of 15% (by total weight of the treatment mixture) solid resin in a xanthan solution (1.1 pounds per barrel) containing 3% PEI with the pH adjusted to specified level). The second stage treatment consisted of a solution of soluble resin (Borden Chemical "ASTRO MEL CR1™") at 70% with N-beta-(aminoethyl)-gamma-aminopropyltrimethoxysilane, available under the trade name "SILQUEST A1120™" from OSi Specialties, a Division of Witco Corporation, Greenwich, Conn. In all cases, a filter cake of 1–4 mm thick was formed.

TABLE 6

| Experiment # | Core Type | Treatment Composition | pH (acid used) | $NH_4Cl$, % Active Amount by wt. of Total Resin | Procedure | Fluid For Burst Strength | Burst Strength, psi |
|---|---|---|---|---|---|---|---|
| 1 | BSS | Stage 1: 0.3% PEI in water<br>Stage 2: 30% "ASTRO MEL CR1 ™" in 0.32% xanthan solution which contained 15% (of total solution wt.) suspension of "M2125 ™"[1] solid resin and encapsulated ammonium chloride | 8.2 (HCl) | 0.7 (encapsulated) | C | Oil | 410 |
| 2 | BSS | Stage 1: 0.3% PEI in 0.32% xanthan solution<br>Stage 2: Same as #1 except no $NH_4Cl$ was not used | 8.2 (HCl) | None | C | Oil | 320 |
| 3 | BSS | Same as #2 except non-encapsulated $NH_4Cl$ | 8.2 (HCl) | 1 (non-encapsulated) | C | Oil | 470 |

TABLE 6-continued

| Experiment # | Core Type | Treatment Composition | pH (acid used) | $NH_4Cl$, % Active Amount by wt. of Total Resin | Procedure | Fluid For Burst Strength | Burst Strength, psi |
|---|---|---|---|---|---|---|---|
| 4 | BSS | Same as #1 except PTSA[4] was used in Stage 1 to adjust pH, and 50% "ASTRO MEL CR1 ™" used in Stage 2 | 8.2 (PTSA) | 1 (encapsulated) | C | Oil | 490 |
| 5 | BSS | Identical to #4 except non-encapsulated $NH_4Cl$ was used | 8.2 (PTSA) | 1 (non-encapsulated) | C | Oil | 500 |
| 6 | BSS | Identical to #1 except 50% resin and larger particle size resin "GM2125 ™"[2] was used with no $NH_4Cl$ | 8.2 (HCl) | None | C | Oil | 585 |
| 7 | BSS | Identical to #6 except 2% non-encapsulated ammonium chloride was used | 8.2 (HCl) | 2 (non-encapsulated) | C | Oil | 650 |
| 8 | Berea | Identical to #7 (The core was treated with 4% KCl solution prior to Stage 1) | 8.2 (HCl) | 2 (non-encapsulated) | C | Water | 590 |
| 9 | Berea | Identical to #6 except that 0.2% "A1120 ™"[3] by wt. of total resin. $NH_4Cl$ was not used | 8.2 (HCl) | None | C | Water | 1430 |
| 10 | BSS | Identical to #6 except J3167 ™ was used as the resin. $NH_4Cl$ was not used | 8.2 (HCl) | None | C | Oil | 600 |
| 11 | BSS | Identical to #6 except larger particle size "GJ3167 ™" was used. $NH_4Cl$ was not used | 8.2 (HCl) | None | C | Oil | 620 |
| 12 | BSS | Identical to #9 except 70% "ASTRO MEL CR1 ™" was used. $NH_4Cl$ was not used | 8.2 (HCl) | None | C | Water | 1070 |
| 13 | BSS | Formulation as in Procedure D with "GM2125 ™"[2] with 0.2% "A1120 ™"[3] by wt. of total resin | 8.2 (HCl) | None | D | Water | 530 |

[1]alpha-cellulose filled melamine-formaldehyde molding grade resin in the powder form and was obtained from AC Molding in Dallas, Texas
[2]Same as in Note 1 except that the material is in the form of coarse grains obtained from AC Molding in Dallas, Texas
[3]Available from OSi Specialties Division of Witco Corporation, Greenwich, Connecticut under the trade name "SILQUEST A1120 ™"
[4]para-toluenesulfonic acid The results in Table 6 show that the treatment compositions containing soluble resin and particulate resin along with appropriate catalyst system(s) provide formation consolidation as well as concurrent chemical casing formation. Comparison of burst strengths in Experiment #1 in fable 5 and Experiments #1 and #3 in Table 6 show that additional strength due to chemical casing on the well bore wall is achieved by using a soluble and insoluble resin combination. The results from Experiments #8 and #9 suggest that a silane coupling agent can be advantageously used to enhance the strengths of the chemical casing (compare with the results from Experiment #8 in Table 5). The results also show that encapsulated catalyst systems can be used effectively to cure the particulate resin as well as soluble resin. For a drilling fluid to remain in the fluid state for the duration of drilling period, it is preferred that encapsulated catalysts instead of non-encapsulated catalysts be used.

Chemical Casing With No Formation Consolidation

In situations where only a casing is desired with no formation consolidation, the process becomes a matter of depositing a filter cake and curing it. The relevant tests were done by treating the cores with an aqueous mixture of solid resin, viscosifying resin, PEI and various catalysts without the dissolved resin. Two typical procedures are provided below.

Procedure E (One-Stage Process): A 15% suspension of solid resin ("GM2125™" or "M2125™") in a xanthan solution containing 3% PEI solution with pH adjusted as specified was used for the core treatment. The treatment when specified also contained a silane ("A1120™") and/or catalysts such as encapsulated or non-encapsulated ammonium chloride or para-toluenesulfonic acid based catalysts when specified. The core was treated until the flow essentially stopped. In all cases, a thin filter cake (1–4 mm thick) was formed. The curing was performed as described earlier.

Procedure F (Two-Stage Process): In the first stage a 3% PEI solution in deionized water at proper pH was pumped through the core. This was followed by treating the core with a 15% suspension of solid resin in xanthan solution (1.1 pounds per barrel) containing either encapsulated or non-encapsulated ammonium chloride or para-d toluenesulfonic acid as catalysts. When specified, "A1120™" (N-beta-(aminoethyl)-gamma-aminopropyltrimethoxysilane) was also added in amounts specified. In all cases, a thin filter cake of 1–3 mm thick was formed. The curing process was carried out as described in the General procedure.

TABLE 7

| Experiment # | Core Type | Treatment Composition | pH (acid used) | $NH_4Cl$, % Active Amount by wt. of Total Resin | Procedure | Fluid For Burst Strength | Burst Strength, psi |
|---|---|---|---|---|---|---|---|
| 1 | BSS | Stage 1: 3% PEI solution in water Stage 2: 15% "M2125 ™" solid resin in 0.86% xanthan solution | 8.2 (HCl) | None | F | Oil | 150 |
| 2 | BSS | Same as #1 with 1% $NH_4Cl$ by wt. of resin in Stage 2 | 8.2 (HCl) | 1 (non-encapsulated) | F | Oil | 190 |
| 3 | BSS | Aqueous suspension containing 3% PEI, 0.32% xanthan; 15% "M2125 ™" and ammonium chloride | 8.2 (HCl) | 1 (non-encapsulated) | E | Oil | 310 |
| 4 | BSS | Same as #3 except para-toluenesulfonic acid (PTSA) was used to adjust pH, | 8.2 (PTSA) | 1 (non-encapsulated) | E | Oil | 230 |

The results in Table 7 show that a chemical casing formed by curing the filter cake formed from particulate resin in combination with appropriate strength modifying polymers and catalyst system will have sufficient strength to extend the drilling operations by reducing casing points or eliminating some metal casing or liners altogether.

then PEI solution was added to obtain a desired PEI concentration. This solution was mixed with the required amount of the melamine resin ("ASTRO MEL CR1 ™") to obtain 10 grams of the mixture with the specified composition. The mixture was placed in a glass bottle and the gel time was measured. The results are shown in Table 8.

TABLE 8

| Experiment # | Weight % of PEI in Total Mix | % Resin in Total Mix | pH Final | Temp., ° F. | Cure Time, Without Xanthan in mins. | Cure Time, With Xanthan in mins. | Comments on Thermoset With No Xanthan | Comments on Thermoset With Xanthan |
|---|---|---|---|---|---|---|---|---|
| 1 | 3.5 | 30 | 8.55 | 140 | 110 | — | No free water, no shrinkage, hard solid | |
| 2 | 2.8 | 30 | 8.6 | 140 | 93 | — | No free water, no shrinkage, hard resin | |
| 3 | 2.5 | 50 | 8.56 | 140 | 78 | — | No free water, no shrinkage, hard solid | |
| 4 | 2.4 | 20 | 8.15 | 140 | 48 | 43 | No free water | |
| 5 | 2.4 | 20 | 9.17 | 160 | 143 | — | No free water; good solid | |
| 6 | 2.1 | 30 | 8.15 | 140 | 31 | 30 | No free water | |
| 7 | 2.1 | 30 | 8.57 | 140 | 99 | 80 | Uniform set; 2 ml free water | Good solid; no free water |
| 8 | 2.1 | 30 | 9.15 | 140 | 227 | 167 | No free water; solid shrunk | Uniform solid; no free water |
| 9 | 2.1 | 30 | 9.18 | 160 | 76 | 119 | No free water; good solid | No free water; little shrinkage |
| 10 | 2.1 | 30 | 8.5 | 160 | 28 | 130 | No water; uniform solid | Good solid; no free water |
| 11 | 2.1 | 30 | 8.07 | 160 | 19 | 34 (pH 8.6) | No free water; uniform solid | Solid; 5 ml free water |
| 12 | 2.1 | 30 | 9.15 | 170 | 35 | 28 | No free water; uniform solid | Good solid; no shrinkage; 0.5 ml free water |
| 13 | 2.1 | 30 | 8.6 | 170 | 20 | 59 | Uniform solid; 0.7 ml free water | No free water; no shrinkage; good solid |
| 14 | 2.1 | 30 | 8.12 | 170 | 13 | 18 | No free water, no shrinkage | No shrinkage; no water; good |
| 15 | 2.0 | 50 | 8.36 | 140 | 76 | — | 0.5 ml free water, no shrinkage, hard solid | |
| 16 | 1.5 | 50 | 9.15 | 140 | 598 | 1000 | 7.5 ml free water | 5 ml free water |
| 17 | 1.5 | 50 | 9.15 | 160 | 145 | 177 | No free water; good solid | 12 ml free water; solid shrunk; poor quality solid |
| 18 | 1.5 | 50 | 7.6 | 160 | 21 | 33 (pH 8.0) | 10 ml free water; hard, non-uniform solid | No free water; no shrinkage |
| 19 | 1.5 | 50 | 9.03 | 170 | 79 | 76 | Poor quality solid; 11.2 ml free water | Not uniform solid; air pockets in solid; no free water |
| 20 | 1.4 | 30 | 8.15 | 140 | 36 | 33 | No free water; brittle solid | Air pockets in the sample |
| 21 | 1.4 | 30 | 9.15 | 140 | 211 | 246 | Solid shrunk; 5 ml free water | Non-uniform solid w/air pockets; 7.5 ml free water |
| 22 | 1.4 | 30 | 8.2 | 160 | 37 | 40 (pH 8.0) | Uniform solid; 8.3 ml free water | 15 ml free water; poor quality solid |
| 23 | 1.4 | 30 | 9.06 | 170 | 31 | 34 | Good solid; 2.4 ml free water | Mushy solid; 14 ml free water |
| 24 | 1.4 | 30 | 7.95 | 170 | 8 | 29 | No shrinkage; 0.6 ml free water | Solid shrunk; 7 ml free water |
| 25 | 1.0 | 50 | 8.15 | 140 | 65 | 120 | | |
| 26 | 1.0 | 50 | 9.15 | 140 | 965 | 380 | Solid not uniform; 15 ml free water | Not good solid; 11 ml free water |
| 27 | 1.0 | 50 | 9.15 | 160 | 523 | 123 | Significant solid shrinkage | 16 ml free water; poor quality |
| 28 | 1.0 | 50 | 8.2 | 160 | 90 | 2.3 (pH 7.7) | Poor solid; 17 ml free water | |
| 29 | 1.0 | 50 | 8.22 | 170 | 37 | 31 | Poor solid, extensive shrinkage; 18 ml free water | 16 ml free water; solid shrunk |
| 30 | 0.9 | 10 | 9.0 | 140 | 137 | — | No free water, spongy solid, no shrinkage | |
| 31 | 0.8 | 20 | 8.15 | 140 | 125 | 60 | | |
| 32 | 0.7 | 30 | 8.15 | 140 | 85 | 92 | Solid not uniform | Free water |
| 33 | 0.5 | 50 | 8.15 | 140 | 142 | 84 | | |
| 34 | 0.35 | 30 | 8.7 | 140 | 510 | | | |

EXAMPLE 7

In this example, control of curing times with temperature, pH, resin concentration and resin type are demonstrated. The curing times were measured by "TECHNE®" gelation timer manufactured by Techne (Cambridge) Limited, Duxford, Cambridge, UK.

For all the experiments, 100 grams of the resin mixture were used. When xanthan gum was used, initially a solution of 1.1 pounds barrel of xanthan gum dissolved in water and The results in Table 8 show that the curing times for the resin compositions can e controlled by pH, temperature, resin/PEI ratio and the amounts of resin and PEI in the treatment composition. For example, the cure time can be decreased by increasing temperature, decreasing pH or resin/PEI ratio.

Thus, the present invention is well adapted to carry out the objects and attain the end and advantages mentioned as well as those which are inherent therein. While numerous changes may be made by those skilled in the art, such changes are encompassed within the spirit of this invention as defined by the appended claims.

What is claimed is:

1. A method of consolidating a zone or formation comprising:
   (a) drilling the zone or formation with a drilling fluid having a pH in the range of from about 6 to about 10 and that comprises water and a polymeric cationic catalyst capable of accepting and donating protons; and
   (b) contacting the zone or formation with a treating fluid having a pH in the range of from about 6 to about 10 and that comprises water, a water soluble or dispersible polymer which is capable of being cross-linked by a thermoset resin and causing the resin to harden when cured, and a water soluble or dispersible thermoset resin which cross-links the polymer, is catalyzed and cured by the catalyst and consolidates the zone or formation.

2. The method of claim 1 wherein the zone or formation comprises unconsolidated rocks and minerals selected from the group consisting of clays, shales and sand stone and wherein said polymeric cationic catalyst is adsorbed on the rocks and minerals in the zone or formation.

3. The method of claim 1 wherein the polymeric cationic catalyst is selected from the group consisting of polyethyleneimine, poly(dimethylaminoethylmethacrylate) and poly(diamethylaminopropylmethacrylate).

4. The method of claim 1 wherein the water soluble or dispersible polymer which is cross-linked by the thermoset resin is selected from the group consisting of polymers containing one or more of hydroxyl, amide, carboxyl and epoxy functional groups.

5. The method of claim 1 wherein the water soluble or dispersible polymer which is cross-linked by the thermoset resin is selected from the group consisting of polyvinylalcohol, polyvinylbutyral, polyesters, polyalkylacrylic acids, polyurethanes, acrylamide polymers, proteins, polyols and polysaccharides.

6. The method of claim 5 wherein the polysaccharides are selected form the group consisting of chitosan, hydroxyethylcellulose, carboxymethylhydroxyethylcellulose, water soluble starches, guar gum, xanthan gum, welan gum, carragenan gum and arabic gum.

7. The method of claim 1 wherein the water soluble or dispersible thermoset resin is selected from the group consisting of melamine-formaldehyde type resins, urea-formaldehyde type resins and phenol-formaldehyde type resins.

8. The method of claim 1 wherein the water soluble or dispersible thermoset resin is selected from the group consisting of an alkyl ether of a melamine-formaldehyde resin and an alkyl ether of a urea-formaldehyde resin.

9. The method of claim 1 wherein the polymeric cationic catalyst is present in the drilling fluid in an amount in the range of from about 1% to about 15% by weight of water in the drilling fluid.

10. The method of claim 1 wherein the polymer which is cross-linked by the thermoset resin is present in the treating fluid in an amount in the range of from about 0.5% to about 20% by weight of water in the treating fluid.

11. The method of claim 1 wherein the thermoset resin is present in the treating fluid in an amount in the range of from about 5% to about 80% by weight of water in the treating fluid.

12. The method of claim 1 wherein the drilling fluid and treating fluid both have a pH of about 8.

13. A method of consolidating a zone or formation while drilling a well bore penetrating the zone or formation comprising:
   (a) drilling the well bore with a drilling fluid having a pH in the range of from about 6 to about 10 and that comprises water and a polymeric cationic catalyst capable of accepting and donating protons; and
   (b) contacting the well bore with a treating fluid having a pH in the range of from about 6 to about 10 and that comprises water, a water soluble or dispersible polymer which is capable of being cross-linked by a thermoset resin and causing the resin to harden when cured, and a water soluble or dispersible thermoset resin which cross-links the polymer, is catalyzed and cured by the catalyst and consolidates the zone or formation.

14. The method of claim 13 wherein the zone or formation comprises unconsolidated rocks and minerals selected from the group consisting of clays, shales and sand stone and wherein said polymeric cationic catalyst is adsorbed on the rocks and minerals in the zone or formation.

15. The method of claim 13 wherein the polymeric cationic catalyst is selected from the group consisting of polyethyleneimine, poly(dimethylaminoethylmethacrylate) and poly(dimethylaminopropylmethacrylate).

16. The method of claim 13 wherein the water soluble or dispersible polymer which is cross-linked by the thermoset resin is selected from the group consisting of polymers containing one or more of hydroxyl, amide, carboxyl and epoxy functional groups.

17. The method of claim 13 wherein the water soluble or dispersible polymer which is cross-linked by the thermoset resin is selected from the group consisting of polyvinylalcohol, polyvinylbutyral, polyesters, polyalkylacrylic acids, polyurethanes, acrylamide polymers, proteins, polyols and polysaccharides.

18. The method of claim 17 wherein the polysaccharide is selected from the group consisting of chitosan, hydroxyethylcellulose, carboxymethylhydroxyethylcellulose, water soluble starches, guar gum, xanthan gum, welan gum, carragenan gum and arabic gum.

19. The method of claim 13 wherein the water soluble or dispersible thermoset resin is selected from the group consisting of melamine-formaldehyde type resins, urea-formaldehyde type resins and phenol-formaldehyde type resins.

20. The method of claim 13 wherein the water soluble or dispersible thermoset resin is selected from the group consisting of an alkyl ether of a melamine-formaldehyde resin and an alkyl ether of a urea-formaldehyde resin.

21. The method of claim 13 wherein the polymeric cationic catalyst is present in the drilling fluid in an amount in the range of from about 1% to about 15% by weight of water in the drilling fluid.

22. The method of claim 13 wherein the polymer which is cross-linked by the thermoset resin is present in the treating fluid in an amount in the range of from about 0.5% to about 20% by weight of water in the treating fluid.

23. The method of claim 13 wherein the thermoset resin is present in the treating fluid in an amount in the range of from about 5% to about 80% by weight of water in the treating fluid.

24. The method of claim 13 wherein the drilling fluid and treating fluid both have a pH of about 8.

25. A method of consolidating a zone or formation while drilling a well bore penetrating the zone or formation comprising: (a) drilling the well bore with a drilling fluid having a pH of about 8 and that comprises water, a cationic, polyethyleneimine catalyst which is adsorbed on the zone or formation and is present in the drilling fluid in an amount in the range of from about 2% to about 10% by weight of water in the drilling fluid; and (b) contacting the well bore with a treating fluid having a pH of about 8 and that comprises water; a polysaccharide polymer which is capable of being cross-linked by a thermoset resin and causing the resin to harden when cured present in an amount in the range of from about 1% to about 10% by weight of water in the treating fluid; and an alkyl ether of a melamine-formaldehyde resin which cross-links the polymer, is catalyzed and cured by the catalyst, consolidates the zone or formation, and is present in an amount in the range of from about 20% to about 70% by weight of water in the treating fluid.

26. A method of consolidating a zone or formation formed of clay, shale and/or sandstone while drilling a well bore penetrating the zone or formation comprising:

(a) drilling the well bore with a drilling fluid having a pH in the range of from about 6 to about 10 and that comprises water and a polymeric cationic catalyst capable of accepting and donating protons and which is adsorbed on the unconsolidated clay, shale and/or sandstone; and (b) contacting the well bore with a treating fluid having a pH in the range of from about 6 to about 10 and that comprises water, a water soluble or dispersible polymer which is capable of being cross-linked by a thermoset resin and causing the resin to harden when cured, and a water soluble or dispersible thermoset resin which cross-links the polymer, is catalyzed and cured by the catalyst and consolidates the zone or formation.

27. The method of claim 26 wherein the polymeric cationic catalyst is selected from the group consisting of polyethyleneimine, poly(dimethylaminoethylmethacrylate) and poly(dimethylaminopropylmethacrylate).

28. The method of claim 26 wherein the water soluble or dispersible polymer which is cross-linked by the thermoset resin is selected from the group consisting of polymers containing one or more of hydroxyl, amide, carboxyl and epoxy functional groups.

29. The method of claim 26 wherein the water soluble or dispersible polymer which is cross-linked by the thermoset resin is selected from the group consisting of polyvinylalcohol, polyvinylbutyral, polyesters, polyalkylacrylic acids, polyurethanes, acrylamide polymers, proteins, polyols and polysaccharides.

30. The method of claim 29 wherein the polysaccharide is selected from the group consisting of chitosan, hydroxyethylcellulose, carboxymethylhydroxyethylcellulose, water soluble starches, guar gum, xanthan gum, welan gum, carragenan gum and arabic gum.

31. The method of claim 26 wherein the water soluble or dispersible thermoset resin is selected from the group consisting of melamine-formaldehyde type resins, urea-formaldehyde type resins and phenol-formaldehyde type resins.

32. The method of claim 26 wherein the water soluble or dispersible thermoset resin is selected from the group consisting of an alkyl ether of a melamine-formaldehyde resin and an alkyl ether of a urea-formaldehyde resin.

33. The method of claim 26 wherein the polymeric cationic catalyst is present in the drilling fluid in an amount in the range of from about 1% to about 15% by weight of water in the drilling fluid.

34. The method of claim 26 wherein the polymer which is cross-linked by the thermoset resin is present in the treating fluid in an amount in the range of from about 0.5% to about 20% by weight of water in the treating fluid.

35. The method of claim 26 wherein the thermoset resin is present in the treating fluid in an amount in the range of from about 5% to about 80% by weight of water in the treating fluid.

36. The method of claim 26 wherein the drilling fluid and treating fluid both have a pH of about 8.

37. A method of consolidating a zone or formation formed of clay, shale and/or sand stone while drilling a well bore penetrating the zone or formation comprising: (a) drilling the well bore with a drilling fluid having a pH of about 8 and that comprises water, a cationic, polyethyleneimine catalyst which is adsorbed on the unconsolidated clay, shale and/or sand stone and is present in the drilling fluid in an amount in the range of from about 2% to about 10% by weight of water in the drilling fluid; and (b) contacting the well bore with a treating fluid having a pH of about 8 and that comprises water; a polysaccharide polymer which is capable of being cross-linked by a thermoset resin and causing the resin to harden when cured present in an amount in the range of from about 1% to about 10% by weight of water in the treating fluid; and an alkyl ether of a melamine-formaldehyde resin which cross-links the polymer, is catalyzed and cured by the catalyst, consolidates the zone or formation, and is present in an amount in the range of from about 20% to about 70% by weight of water in the treating fluid.

* * * * *